June 5, 1951  J. L. RICKETTS  2,555,657
OPTICAL LENS MARKING MACHINE
Filed May 27, 1947  2 Sheets-Sheet 1

Inventor:
John L. Ricketts
by his Attorneys
Howson & Howson

June 5, 1951  J. L. RICKETTS  2,555,657
OPTICAL LENS MARKING MACHINE
Filed May 27, 1947  2 Sheets-Sheet 2

Inventor:
John L. Ricketts
by his Attorneys
Howson & Howson

Patented June 5, 1951

2,555,657

UNITED STATES PATENT OFFICE 2,555,657

OPTICAL LENS MARKING MACHINE

John L. Ricketts, Philadelphia, Pa., assignor of one-half to Frederick Ricketts, Philadelphia, Pa.

Application May 27, 1947, Serial No. 750,859

8 Claims. (Cl. 33—189)

This invention relates to new and useful improvements in marking apparatus, and more particularly to apparatus for marking optical lenses in accurate alignment with the holes in the frames therefor preparatory to drilling the lenses to receive the screws which secure the lenses in the frames.

In the manufacture of many types of spectacles and nose glasses it is customary for the optician to purchase the frames and lenses separately and then complete the assembly by first drilling holes in the lenses at the appropriate points to receive the screws which are then inserted to secure the lenses in the particular frame structure. Before drilling the screw holes in the lenses the location of the holes must first be accurately determined and marked on the lenses for the guidance of the drill operator. In the past, marking of the lenses as described has been done for the most part more or less manually and, as the accurate marking of the lenses can be accomplished only by the exercise of care and skill, the more or less manual procedures employed are time-consuming and, therefore, expensive.

The frames as they come from the manufacturer are true and accurate and, with this in mind, the principal object of the present invention is to provide a novel lens marking machine or apparatus wherein the frame of the spectacles is employed as the gauge for marking on the lenses the locations of the screw holes to be drilled therein.

Another object of the present invention is to provide a novel machine or apparatus as set forth in which marking of the optical lenses can be performed with extreme accuracy and facility and in which the liability of error is substantially eliminated.

A further object of the present invention is to provide a novel machine or apparatus of the character described which is quickly adjustable to effect accurate marking of optical lenses in accordance with the various millimeter dimensions existing in different frame structures.

A still further object of the invention is to provide a novel machine or apparatus having the features and advantages set forth which is highly efficient and foolproof in operation and use.

These and other objects of the invention and the various features and details of the construction and operation thereof, are hereinafter fully set forth and described with reference to the accompanying drawing, in which.

Figure 1:
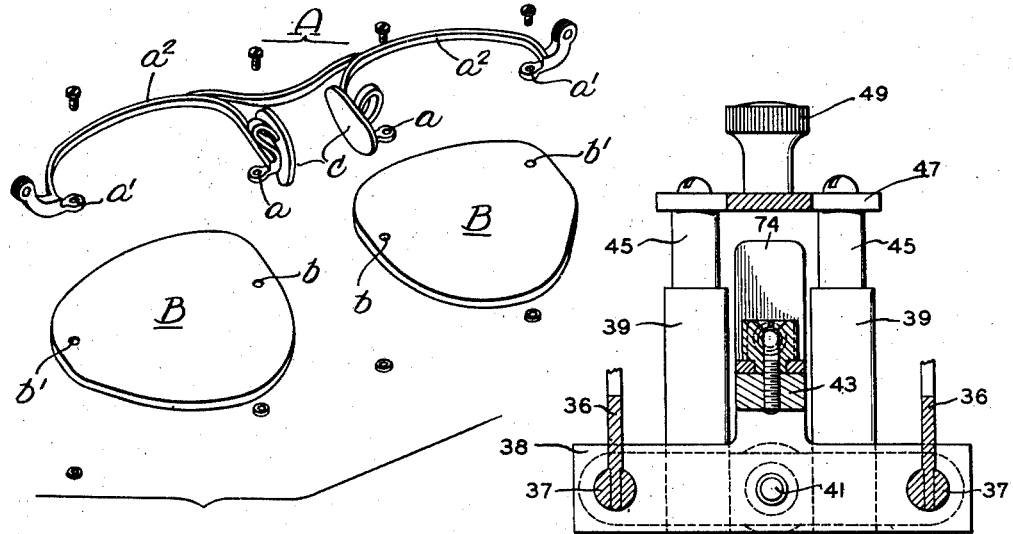
Fig. 1 is a view in perspective of a typical spectacle frame and its lenses in detached relation showing the screw holes in the frames which must be properly located and marked on the lenses preparatory to drilling the screw-receiving holes therein.
Figure 5:
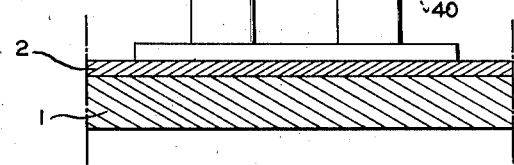
Fig. 5 is a sectional view taken on line 5—5, Fig. 3.

Referring now to the drawings, and more particularly to Fig. 1 thereof, a spectacle frame structure A and its customary two lenses B, B are shown in detached relation with the screw holes $a$, $a'$ of the frame in vertical alignment with the screw holes $b$, $b'$ in the lenses B, B.

Referring now more particularly to Figs. 2 to 5 of the drawings, there is illustrated one embodiment of the present invention which is operable to mark with extreme accuracy upon the optical lenses B, B the points at which the screw holes $b$, $b'$ are to be drilled therein in true alignment with the screw openings $a$, $a'$ in a particular frame structure A. As shown in the drawings, the illustrated embodiment of the invention comprises a base 1 upon which is superimposed a base plate 2 which is hingedly connected to the base 1 along the forward edge thereof as indicated at 3 whereby the base plate 2 may be adjustably positioned relative to the base 1 at any desired angle of inclination for facility and ease of operation. For the purpose of adjustably positioning the plate 2, a vertical adjusting screw 4 having a manual turn knob 5 at its upper end is rotatably mounted in spaced projecting lugs 6 and 7 secured to the plate 2 and the base 1, respectively, for example, in the manner shown in Fig. 2 of the drawings, and threaded on the adjusting screw 4 intermediate the projecting lugs 6 and 7 is a nut or the like 8 which is restrained against rotation by a lug 9 thereon which is engaged in a slot 10 in the adjacent edge of the base plate 2.

Secured upon the upper face of the base plate 2 and extending parallel to the front edge thereof is a pair of relatively spaced guide rails 11, 11 on which is slidably mounted a pair of bed plates 12, 12 of generally rectangular configuration that extend parallel to the base plate 2. These bed plates 12, 12 each have a lug 13 formed at their underside which is disposed intermediate the guide rails 11, 11, and these lugs 13 are threaded upon the right and left hand portions, respectively, of a reversely threaded spindle 15 which is rotationally journaled in spaced bearings 16 located adjacent opposite ends of the guide rails 11, 11. The spindle 15 projects endwise beyond one of the bearings 16 and has a manual adjusting knob 18 secured thereon whereby the reversely threaded spindle 15 may be rotated in the appropriate direction to actuate the bed plates 12, 12 toward and away from each other. Associated with one of the bed plates 12 is a projecting pointer arm 19 which is disposed laterally adjacent a scale 20 secured upon a standard 21 fixed to the base plate 2 and this scale 20 is graduated in millimeters for positioning the plates 12 according to the spacing between the bridge holes a.

Secured upon and carried by each of the bed plates 12 is a suitable support 22 for one of the lenses B which is to be marked preparatory to drilling of the screw holes b, b' therein. For securing the lenses in position upon the supports 22, an upstanding standard or post 23 is secured to each bed plate 12 and vertically adjustable on these posts 23 are arms 24 which are arranged to overlie the adjacent lens supports 22. At their free end the arms 24 carry a cushion or pad 25 which is adapted to be brought into engagement with and bear upon the upper face of a lens B and clamp or hold the same firmly in place upon its underlying support 22.

In addition to the clamping action of the pads 25, the lenses B, B are adapted to be restrained against movement upon their supports 22 by means of an abutment 26 which engages the forward or bottom edges of the lenses and abutments 27 which are arranged to engage the rearward or top edges of the lenses.

The forward abutment 26 is slidably mounted parallel to the base plate 2 upon a plate 28 which is adjustably supported above the plate 2 upon standards or posts 29 secured thereto. For the purpose of slidably adjusting the abutment 26 relative to the plate 28 as described, the abutment 26 is provided with an outwardly projecting arm portion 30 which is arranged in overlying relation to an outward extension 31 of the support plate 28. Mounted upon or formed as a part of this extension 31 of the plate 28 is a block 32 in which is mounted a thumb screw 33 that has its shank portion 34 threaded inwardly of the outer end of the aforesaid abutment projecting arm portion 30. By this construction and arrangement it will be apparent that as the thumb screw 33 is rotated in the appropriate direction the abutment 26 may be advanced into engagement with the forward or bottom edges of the lenses B, B or may be disengaged and backed-off therefrom.

The rearward abutments 27 for engagement with the top edges of the lenses B, B are secured forwardly of each of a pair of vertically disposed brackets 36, 36 carried at the forward ends of rods 37, 37. These rods 37 are mounted for a sliding movement parallel to the base plate 2 in a block 38 which is provided with laterally spaced openings therein that receive a pair of vertically disposed tubular bearings 39. These bearings are secured upon the base plate 2 and the block 38 is fixedly mounted upon the tubular bearings 39 in the desired position above the said base plate 2. The outer extremities of the rods 37, 37 are connected by a cross-head 40 having an adjusting screw 41 mounted therein which is threaded in the block 38 and arranged upon rotation of the adjusting screw 41 in the appropriate direction to actuate the rods 37 and brackets 36 toward or away from the lenses B, B and thereby engage or disengage the abutments 27 with the rearward or top edges of the lenses.

Formed integrally with the block 38 is an arm portion 43 which extends parallel to the base plate 2 in a forward direction and terminates intermediate the lens supports 22, 22 in an abutment portion 44 for the adjacent inner edges of the lenses B, B when the supports are disposed in their innermost adjusted position.

Slidably mounted in the aforesaid tubular bearings 39, 39 are plungers 45, 45 whose downward movement normally is opposed by coil springs 46. The upper ends of the plungers 45 are connected to the rearward extension 47 of a plate 48 which overlies the lenses B, B in spaced relation thereto. Secured to this interconnecting rearward portion 47 of the plate 48 intermediate the plungers 45 is a push knob 49 by means of which the plungers 45, together with the plate 48, may be actuated downwardly against the force of the springs 46.

Formed more or less centrally of the plate 48 are aligned longitudinally extending slots 50 in each of which is slidably mounted a block 51 that is threaded on the right and left hand portions, respectively, of a reversely threaded spindle 52. This spindle 52 is rotatably supported in bearings 53 secured at the underside of the plate 48, and fixed on one end of the spindle 53 is a knob or thumb nut 54 by means of which the spindle may be rotated in the appropriate direction to properly position the blocks 51 relative to each other as hereinafter described.

Mounted for vertical sliding movement within each of the blocks 51 is a plunger member 55 which normally is urged in the downward direction. Extending upwardly and in coaxial alignment with the plunger 55 is a pin 56 which projects above the block 51 (see Fig. 4) and is adapted to engage through one of the screw openings a of the spectacle frame A. Formed on the lower end of the plungers 55 in coaxial alignment with the pins 56 is an ink pen 57 for marking the lenses B, B on the supports 22, 22 in correspondence to the spectacle frame screw holes a, a.

Figure 2:
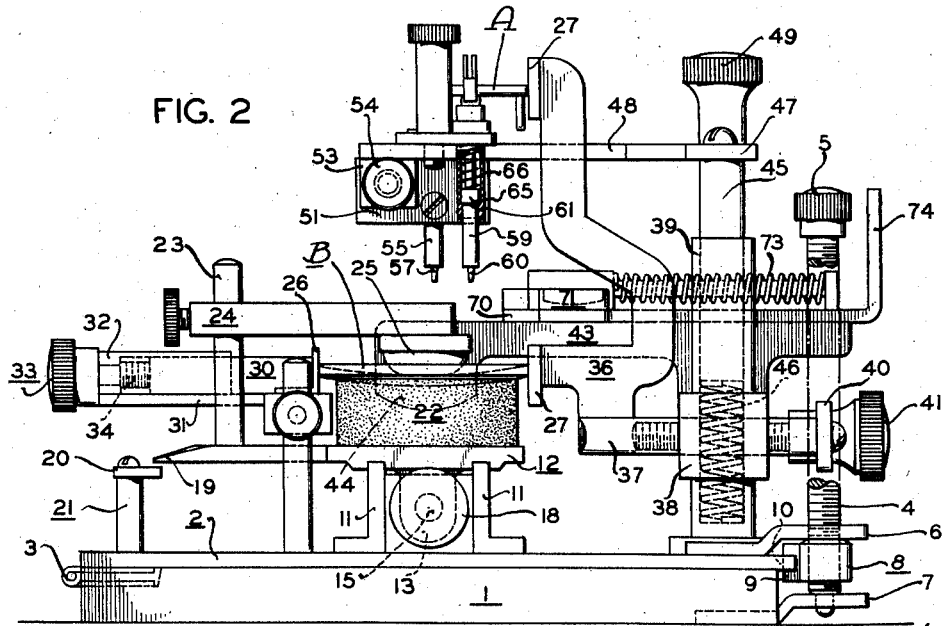
Fig. 2 is an end elevational view of one embodiment of lens marking machine or apparatus made according to the present invention.
Figure 3:
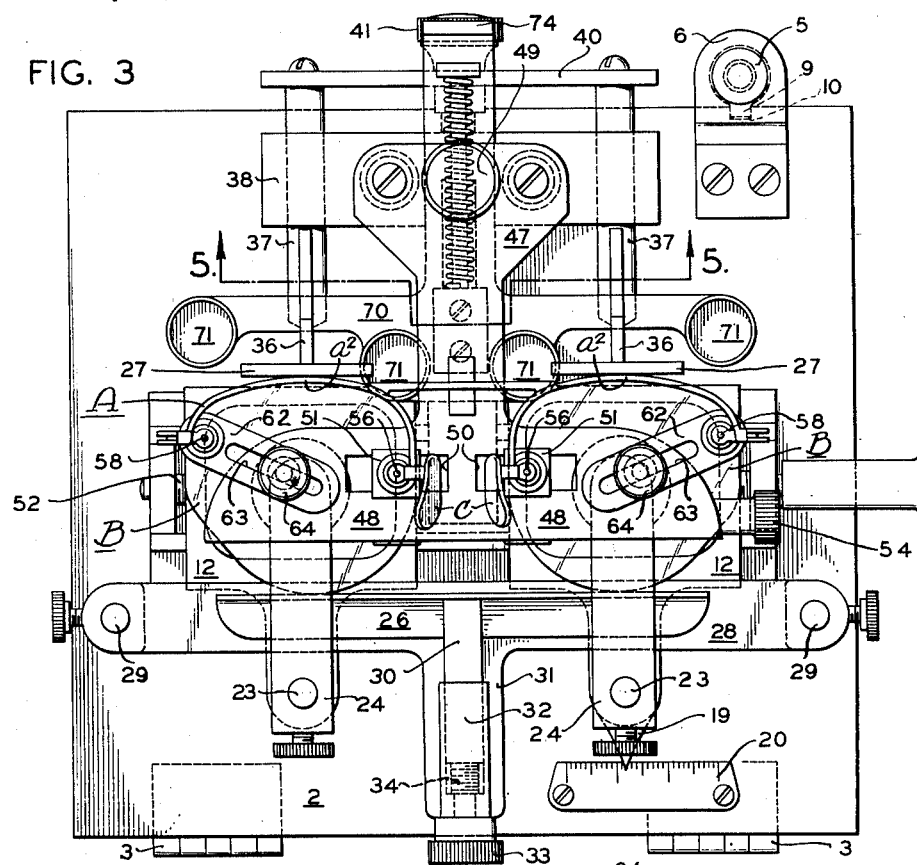
Fig. 3 is a plan view of said machine.
Figure 4:
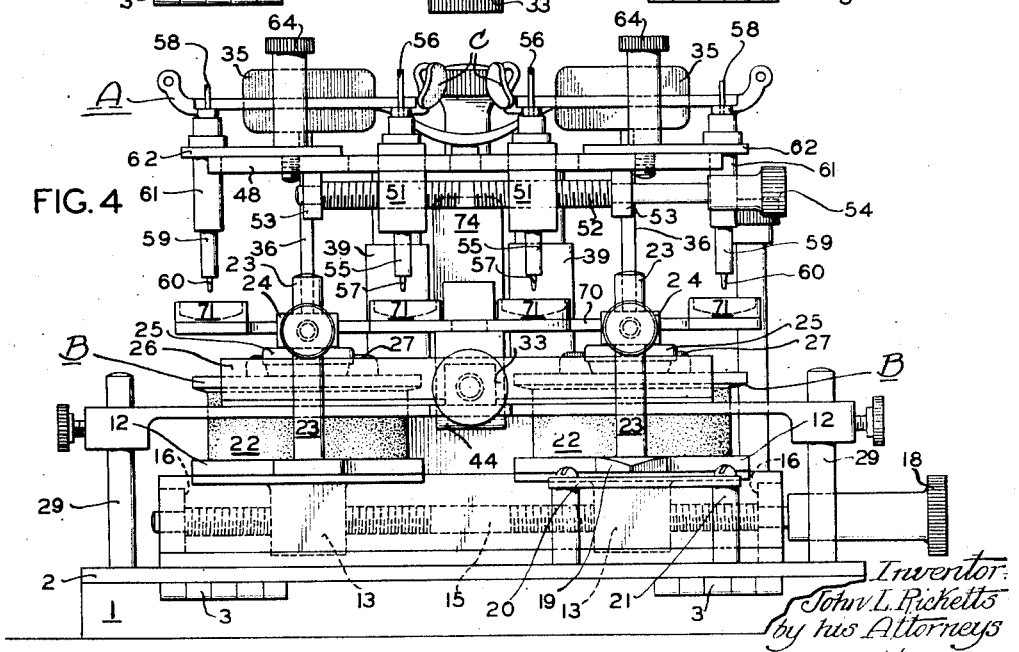
Fig. 4 is a front elevational view thereof.

Similar pins 58 and plungers 59 having pen portions 60 are provided for respectively engaging the outer spectale frame openings a', a' and correspondingly marking the lenses B, B preparatory to drilling the same. However, instead of mounting these pen and plunger assemblies in blocks, such as the blocks 51, these plunger assemblies for the outer spectacle frame holes a', a' are slidably mounted in support members 61 which are secured adjacent the outer ends of brackets 62 provided with slots 63 and adjustably secured through said slots to opposite ends of the plate 48 by means of manually operated clamp screws 64. The general construction of these plunger and pin assemblies is shown in Fig. 2 of the drawing wherein the plunger has a shoulder 65 and normally is urged downward by a spring 66 to the limit permitted by the shoulder 65.

Mounted for sliding movement upon the forwardly extending abutment arm portion 43 of the block 38 in a direction forwardly and rearwardly of the device and parallel to the base plate 2 is a slide 70 which carries a plurality of ink pads 71, one for each of the pens 57, 57 and 60, 60. This slide 70 normally is urged rearwardly of the device and removed from the path of vertical travel of the pens 57, 57 and 60, 60 by means of a spring 73 and is adapted to be actuated forwardly, to position the ink pads beneath the pens for inking the latter, by forward pressure exerted manually upon the slide finger portion 74 against the action of the spring 73.

In using the apparatus of the present invention to mark a pair of lenses B, B, in accurate alignment with the holes in the frames preparatory to drilling the lenses to receive the screws which secure the lenses in the frame, the sets of pins 56, 56 and 58, 58, respectively, are adjusted relative to the plate 48 by manipulation of the thumb nut 54 and clamp screws 64, so that said sets of pins 56, 56 and 58, 58 may be engaged respectively through the openings $a$ and $a'$ of the frame A, for example, in the general relationship shown in the drawings.

The upper abutments 35 on the vertical brackets 36 are now brought into engagement with the rearwardly disposed top edges of the spectacle bands $a^2$ by turning the thumb nut 41 in the proper direction to effect forward movement of the rods 37 to which the aforesaid brackets 36 are secured. This adjustment of course, similarly positions the lower abutments 27 for engagement by the lens top edges.

The supports 22 are adjustably positioned by manipulation of the turn knob 18 to properly space them with reference to the gauge number of the frame A appearing on the scale 20. The lenses B, B now are positioned upon their respective supports 22 with the rearwardly disposed top edge of the lenses engaging against the abutments 27. The arms 24 then may be swung inwardly and positioned to engage the pads 25 thereof in firm clamping relation upon the lenses B, B thus securing the latter against accidental displacement from their supports 22. The abutment 26 is next adjusted inwardly to engage the forwardly disposed bottom edges of the lenses by turning the thumb nut 33 in the appropriate direction.

The lenses B, B now are in correct position for marking and, with the plate 48 still in its elevated position, the slide 70 is actuated forwardly against the spring 73 to place the ink pads 71 under the elevated pens 59 and 62 and the latter then are actuated downwardly to engage said ink pads by exerting a downward force on the knob 49 thus causing the plungers 45 to move downwardly within the tubular bearings 39 against the action of the springs 46. When the pens have been inked, pressure on the knob 49 is released causing the springs 46 to elevate the pens, at which time the spring 73 is permitted to actuate the slide 70 and its ink pads 71 rearwardly out of the path of the pens. As soon as the pads 71 have cleared from beneath the pens, downward pressure is exerted again upon the knob 49 thereby actuating pens 57, 57 and 60, 60 downwardly into engagement with the underlying lenses B, B to make an imprint or mark thereon in the exact position for drilling the screw holes $b$ and $b'$ in the lenses in accurate alignment with respect to the screw holes $a$ and $a'$ in the frame A. When the lenses have been marked as described the pressure on the knob 49 is released thus causing the springs 46 to elevate the plate 48 and pens 57, 57 and 60, 60 carried thereby, after which the forward abutment 26 may be backed off and the pads 25 removed from clamping engagement with the lenses to permit them to be removed from the supports 22.

I claim:

1. In apparatus for marking optical lenses preparatory to drilling holes therein in accurate alignment with holes in the frame in which said lenses are to be mounted, a pair of laterally adjustable lens supports, means to adjust the relative lateral spacing of said supports according to the gauge of the frame for which said lenses are to be marked, marking means adjacent said supports movable toward and away from said supports for engagement with optical lenses thereon to mark the same, means associated with said marking means in alignment therewith for engaging holes in the frame to position said marking means in alignment with said frame holes, and vertically disposed abutment means arranged to engage the top edge portions of the frame and engageable by the top edge portions of lenses upon said supports to correctly align said lenses vertically with reference to the frame.

2. In apparatus for marking optical lenses preparatory to drilling holes therein in accurate alignment with holes in the frame in which said lenses are to be mounted, a pair of laterally adjustable lens supports, means to adjust the relative lateral spacing of said supports according to the gauge of the frame for which said lenses are to be marked, marking means adjacent said supports movable toward and away from said supports for engagement with optical lenses thereon to mark the same, means associated with said marking means in alignment therewith for engaging holes in the frame to position said marking means in alignment with said frame holes, vertically disposed abutment means arranged to engage the top edge portions of the frame and engageable by the top edge portions of lenses upon said supports to correctly align said lenses vertically with reference to the frame, and means engaging upon said lenses to secure the same upon said supports.

3. In apparatus for marking optical lenses preparatory to drilling holes therein in accurate alignment with holes in the frame in which said laterally adjustable lenses are to be mounted, a pair of lens supports, means to adjust the relative lateral spacing of said supports according to the gauge of the frame for which said lenses are to be marked, marking means adjacent said supports movable toward and away from said supports for engagement with optical lenses thereon to mark the same, means associated with said marking means in alignment therewith for engaging holes in the frame to position said marking means in alignment with said frame holes, spring means normally biasing said marking devices away from the supports, vertically disposed abutment means arranged to engage the top edge portions of the frame and engageable by the top edge portions of lenses upon said supports to correctly align said lenses vertically with reference to the frame, and means engaging upon said lenses to secure the same upon said supports.

4. In apparatus for marking optical lenses preparatory to drilling holes therein in accurate alignment with holes in the frame in which said lenses are to be mounted, a pair of laterally adjustable lens supports, means to adjust the relative spacing of said supports according to the gauge of the frame for which said lenses are to be marked, marking devices adjacent said supports movable toward and away from said supports for engagement with optical lenses thereon to mark the same, means associated with said marking devices in alignment therewith for engaging holes in the frame to position said marking device in alignment with said frame holes, inking means movable to positions underlying said marking devices for engagement by said devices upon downward movement thereof to ink the same, and spring means normally biasing said inking means out of the path of movement of the marking devices.

5. In apparatus for marking optical lenses preparatory to drilling holes therein in accurate alignment with holes in the frame in which said lenses are to be mounted, laterally adjustable support means for a pair of lenses, a plurality of marking devices adjacent said support means mounted for adjustment laterally with respect to one another and having means associated in alignment therewith for engaging holes in said frame to position said marking devices in alignment with said frame holes, said marking devices being movable in a body toward and away from said support means for engagement with optical lenses thereon to mark the same, and inking means movable to positions underlying said marking devices for engagement by said devices upon downward movement thereof to ink the same.

6. In apparatus for marking optical lenses preparatory to drilling holes therein in accurate alignment with holes in the frame in which said lenses are to be mounted, a pair of lens supports mounted for adjustment laterally with respect to one another, means to adjust the relative lateral spacing of said supports corresponding to the gauge of the frame for which said lenses are to be marked, a plurality of marking devices adjacent said supports mounted for adjustment laterally with respect to one another and having means associated in alignment therewith for engaging holes in the frame to position said marking devices in alignment with said frame holes, said marking devices being movable in a body toward and away from said supports for engagement with optical lenses thereon to mark the same, and relatively vertically spaced abutment means arranged respectively to engage the top edge portions of the frame and be engaged by the top edge portions of lenses upon said supports to correctly align said lenses vertically with reference to the frame.

7. In apparatus for marking optical lenses preparatory to drilling holes therein in accurate alignment with holes in the frame in which said lenses are to be mounted, a pair of lens supports mounted for adjustment laterally with respect to one another, means to adjust the relative lateral spacing of said supports corresponding to the gauge of the frame for which said lenses are to be marked, a plurality of marking devices adjacent said supports mounted for adjustment laterally with respect to one another and having means associated in alignment therewith for engaging holes in the frame to position said marking devices in alignment with said frame holes, said marking devices being movable in a body toward and away from said supports for engagement with optical lenses thereon to mark the same, spring means normally biasing said marking devices away from the supports, relatively vertically spaced abutment means arranged respectively to engage the top edge portions of the frame and be engaged by the top edge portions of lenses upon said supports to correctly align said lenses vertically with reference to the frame, and means engaging upon said lenses to clamp the same upon said supports.

8. In apparatus for marking optical lenses preparatory to drilling holes therein in accurate alignment with holes in the frame in which said lenses are to be mounted, a pair of lens supports mounted for adjustment laterally with respect to one another, means to adjust the relative lateral spacing of said supports corresponding to the gauge of the frame for which said lenses are to be marked, a plurality of marking devices adjacent said supports mounted for adjustment laterally with respect to one another and having means associated in alignment therewith for engaging holes in the frame to position said marking devices in alignment with said frame holes, said marking devices being movable in a body toward and away from said supports for engagement with optical lenses thereon to mark the same, inking means movable to positions underlying said marking devices for engagement by said devices upon downward movement thereof to ink the same, and means normally biasing said inking means out of the path of movement of the marking devices.

JOHN L. RICKETTS.

REFERENCES CITED

The following references are of record in the file of this patent:

UNITED STATES PATENTS

| Number | Name | Date |
| --- | --- | --- |
| 766,748 | Vauclain | Aug. 2, 1904 |
| 1,134,938 | Bader et al. | Apr. 6, 1915 |
| 1,164,795 | Emerson | Dec. 21, 1915 |
| 1,556,683 | Fernald | Oct. 13, 1925 |
| 1,677,382 | Bugbee | July 17, 1928 |
| 1,876,757 | Rohland | Sept. 13, 1932 |
| 2,387,852 | Maloff | Oct. 30, 1945 |